Dec. 20, 1938.  E. RICHTER ET AL  2,141,092
SIDE AND REAR DELIVERY HEARSE
Filed Jan. 14, 1935  6 Sheets-Sheet 1
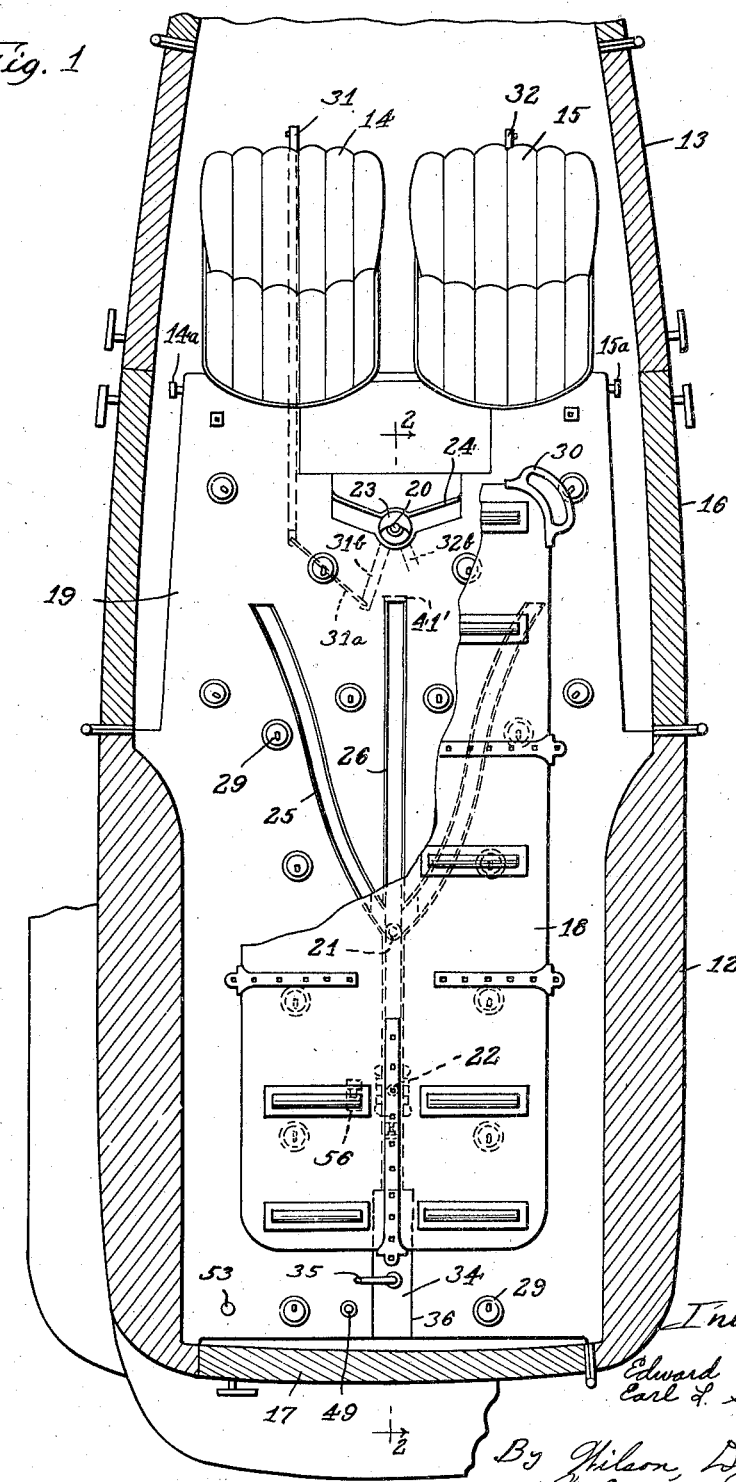

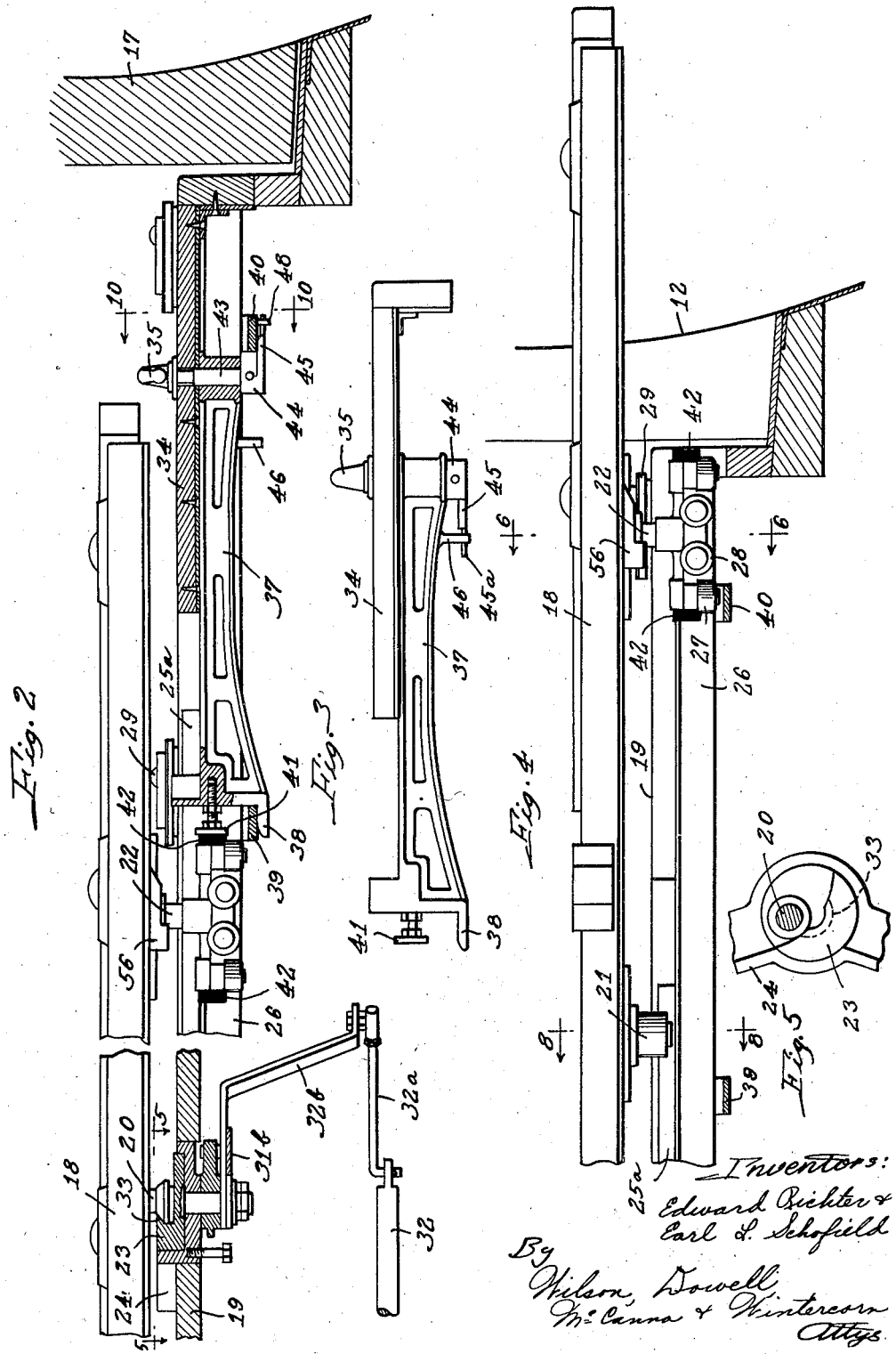

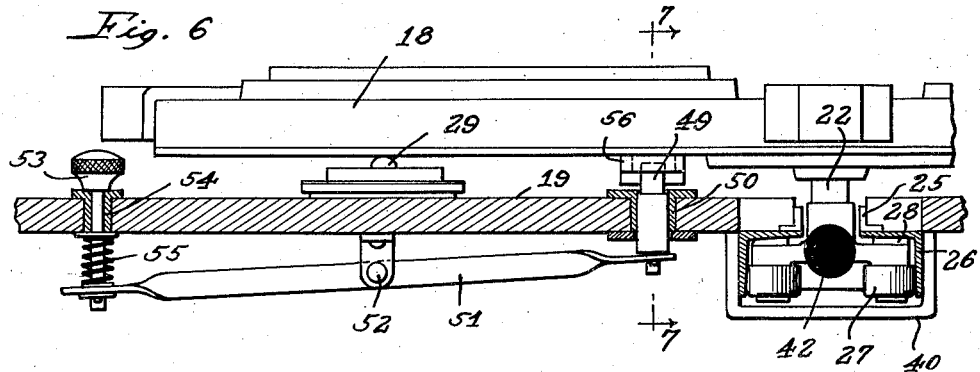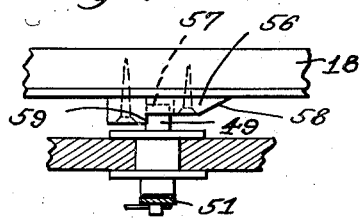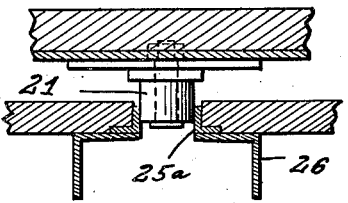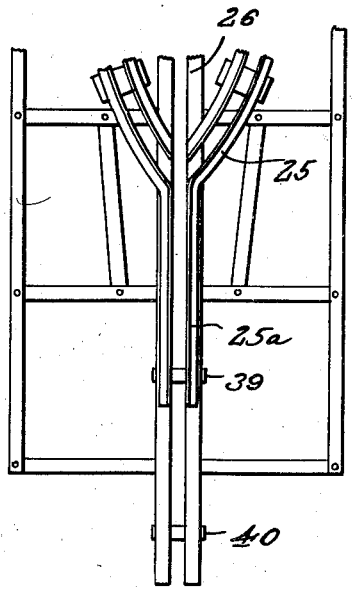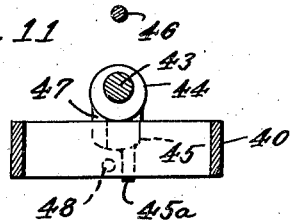

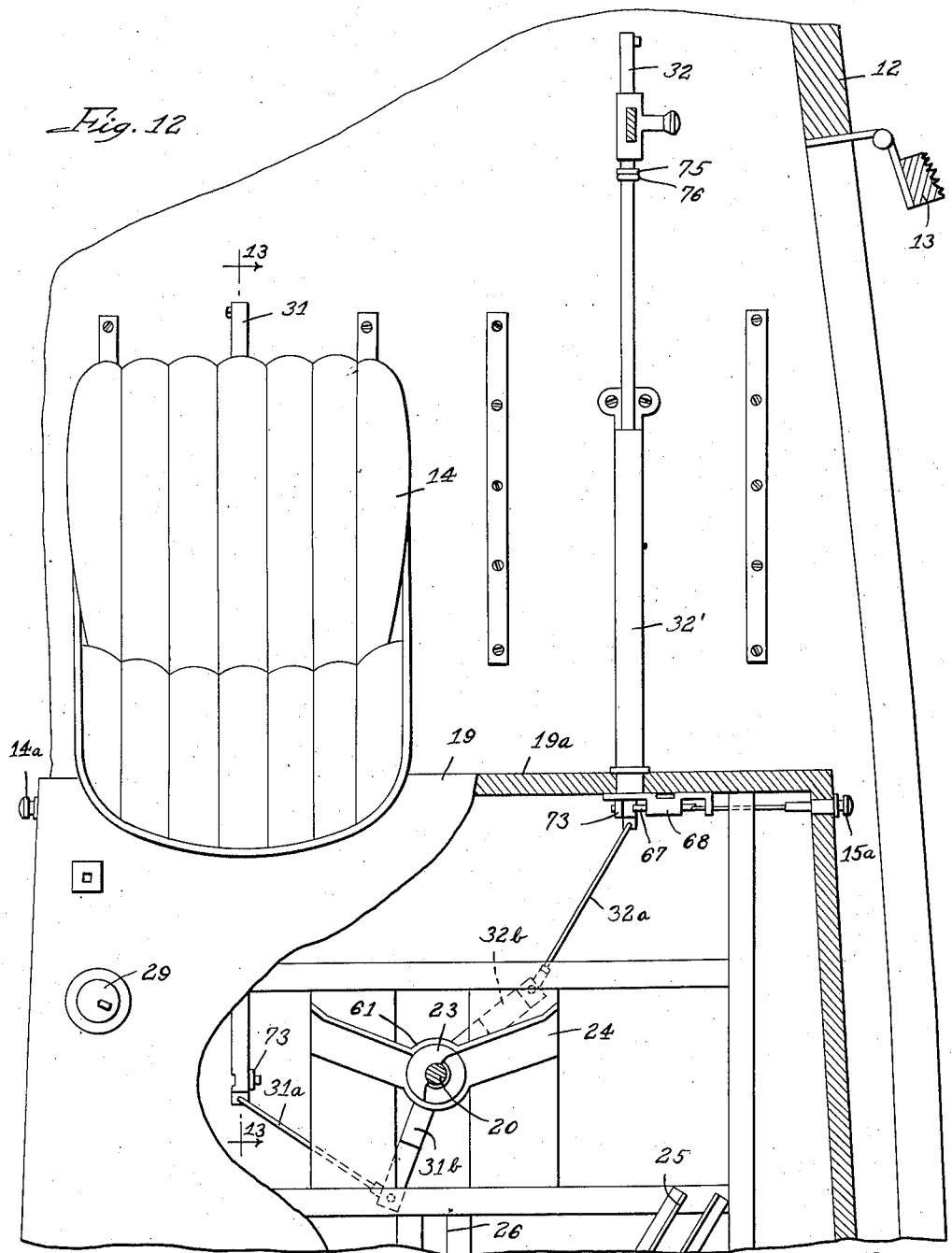

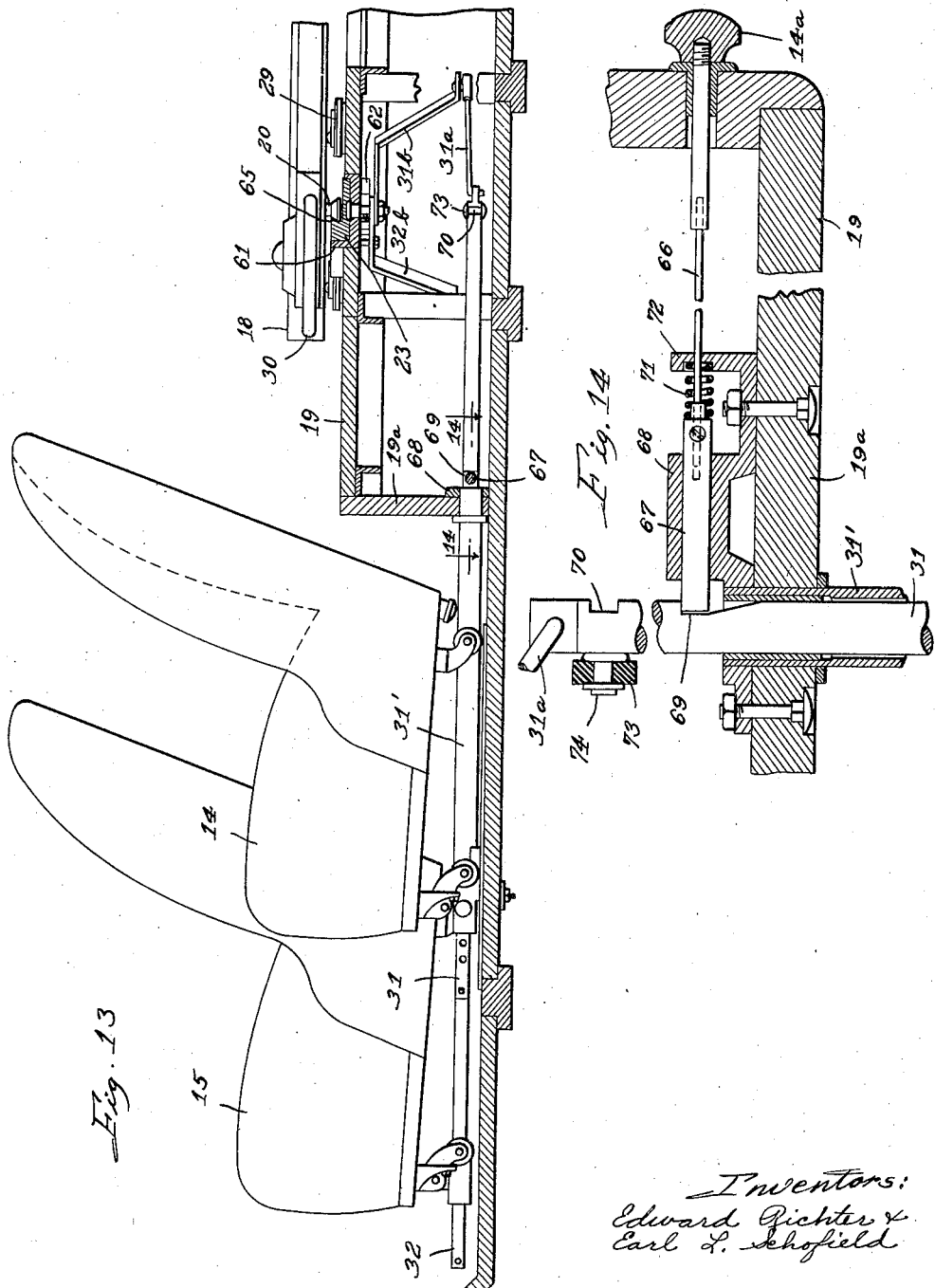

Dec. 20, 1938.　　　E. RICHTER ET AL　　　2,141,092
SIDE AND REAR DELIVERY HEARSE
Filed Jan. 14, 1935　　　6 Sheets-Sheet 6
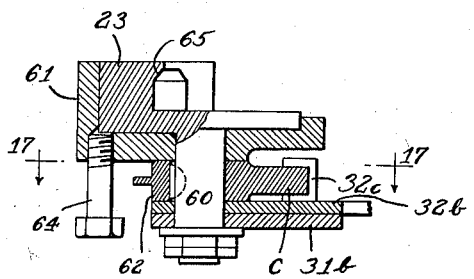
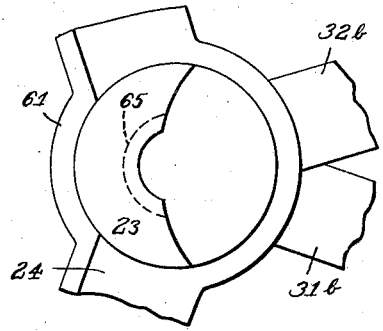
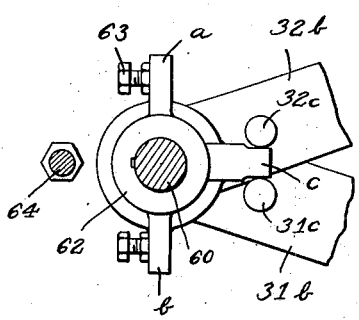
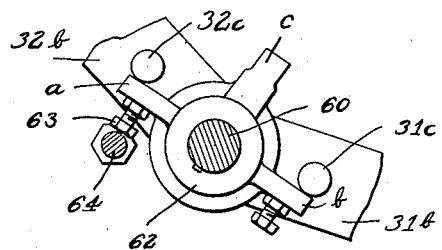
Inventors:
Edward Richter &
Earl L. Schofield
By McCanna, Wintercorn & Morsbach
Attys.

Patented Dec. 20, 1938

2,141,092

UNITED STATES PATENT OFFICE 2,141,092

SIDE AND REAR DELIVERY HEARSE

Edward Richter and Earl L. Schofield, Freeport, Ill., assignors to Henney Motor Company, Freeport, Ill., a corporation of Delaware Application January 14, 1935, Serial No. 1,749

31 Claims. (Cl. 296—16)

This invention relates to hearses, and is more particularly concerned with improvements in a hearse of the side delivery type with a view to affording similar advantages in rear delivery.

Side delivery is usually preferred, but occasionally it would be of advantage if the casket table were movable out through the rear. It is, therefore, the principal object of our invention to provide a hearse construction of the side delivery type which is readily convertible to permit rearward movement of the table by simply removing a small part that otherwise closes the rear end of the longitudinal guide under the table.

Another object consists in the provision of simple and effective means whereby the table is automatically halted when moved to the rear a predetermined distance, the table being furthermore releasably locked in such position so as to make it convenient to replace the casket on the table. The lock is quickly releasable manually to permit return of the table to its normal position, or removal of the table from the hearse.

Another important object of the invention is the provision of seats connected with the table mechanism in such a way that the sliding forward of a seat designates the route of table movement to the right or left side of the hearse according to which seat is moved. In this connection, there is an oscillating combined switch and stop member associated with one of a plurality of guide pins on the table operable in guide channels in the hearse, the switch member serving in one position to lock the table by means of the pin positively in its normal central position but arranged when turned slightly in either direction to open one guide channel and close the other so as to determine the direction of movement of the table toward either side of the hearse, the switch member being connected with the sliding seats so as to be held positively in its locked position when the seats are in normal position, and so as to be turned in the proper direction for the desired table movement when one of the seats is slid forward for the unlocking or loading of a casket through the side of the hearse.

Other objects are concerned with various improvements in details of construction. For example, the shuttle or main anchor guide for the table is provided with rubber bumpers, front and rear, to silence the impact at the limits of movement, and provision is made on the one hand for compression of the rear bumper when the table is returned from a side delivery position, and on the other hand when the removed piece is replaced after a rear delivery, whereby to insure in either case resilient clamping of the table to avoid vibration and rattling when the hearse is in motion.

The invention will be better understood as the following detailed description makes reference to the accompanying drawings, in which—

Figure 1 is a horizontal section through the body of a hearse showing the casket table in plan view and one portion thereof broken away to show the casters on the mound therebeneath, as well as the longitudinal guide and a lateral guide in elevation, and also to disclose the front switch member for locking the table in normal position or guiding it to the right or left;

Fig. 2 is a longitudinal section in a vertical plane on the line 2—2 of Fig. 1, with an intermediate portion of the table and mound broken away so as to enable showing the construction on a larger scale;

Fig. 3 is a side view of the removable closure plate;

Fig. 4 is a section similar to a part of Fig. 2 showing how the table is movable to the rear when the closure plate is removed, this view also showing the middle guide member which does not appear in Fig. 2;

Fig. 5 is a horizontal sectional detail on the line 5—5 of Fig. 2, showing the switch member in plan view but turned for right-hand delivery, and showing the front guide member just about to enter the switch member to be locked in the recess thereof;

Fig. 6 is a cross-section on the line 6—6 of Fig. 4 showing the automatic releasable lock for the table in its rear position;

Fig. 7 is a sectional detail on the line 7—7 of Fig. 6 to better illustrate the lock;

Fig. 8 is a sectional detail on the line 8—8 of Fig. 4 showing the middle guide member and the relationship of its guide to the main longitudinal guide in which the shuttle operates;

Fig. 9 is a plan view of the mound frame with the top thereof removed and further illustrating the relationship of the guides;

Fig. 10 is a sectional detail on the line 10—10 of Fig. 2 showing the lock for the abutment plate;

Fig. 11 is a cross-section on the line 11—11 of Fig. 10;

Fig. 12 is a view partly in plan and partly in horizontal section showing the parts in the mounted position under the table, with the right seat slid forward to permit movement of the table to the right;

Fig. 13 is a vertical section on the line 13—13 of Fig. 12 further disclosing the mounted structure;

Fig. 14 is an enlarged horizontal section on the line 14—14 of Fig. 13 showing the manually releasable lock for the seats;

Fig. 15 is a plan view of the switch stop member appearing in vertical cross-section in Fig. 16;

Fig. 17 is a horizontal section on the line 17—17 of Fig. 16, and

Fig. 18 is a section similar to Fig. 17 but showing the parts in moved position.

The same reference numerals are applied to corresponding parts throughout the views.

Referring first in a general way to Figs. 1 and 2, 12 designates the body of a hearse having the usual doors 13 for use of the driver and a passenger occupying seats 14 and 15, and having other side doors 16 arranged to be opened only when a casket is to be loaded or unloaded from the side of the hearse. A rear door 17 may be opened if, as will presently appear, the casket is to be loaded or unloaded from the rear. The casket, not shown, is supported on the table 18, movable relative to a raised platform or "mound" 19 which extends the full length of the body from the rear door 17 up to the seats 14—15. The table 18 is guided in its movement to and from extended position by three guide members 20, 21, and 22. The front guide member 20 is in the form of a pin or stud projecting downwardly from the bottom of the table and arranged to be locked in a combined switch and stop member 23. The guide member 20 is free to move laterally in either one of two short guides 24 when the switch member 23 is turned in one direction or the other. Thus, the guide member 20 is movable toward the right of the hearse when the switch member 23 is in the position shown in Figs. 5 and 12. The second or middle guide member 21 may be a pin or roller also projecting downwardly from the bottom of the table 18 for movement in either of two guides 25 branching from the main longitudinal guide 26, wherein the third and main guide member 22 operates. The latter is hereinafter referred to as the shuttle, because it operates back and forth between the ends of the one guide 26 every time. The guides 24 cooperate with the guide member 20 slightly above the level of the mound 19, as indicated in Figs. 2 and 13. The guides 25 and their extensions 25a, hereinafter referred to, are flush with the top of the mound so that the guide member 21 has to project into the mound to operate therein, as indicated in Figs. 4 and 8. The guide 26, however, is entirely beneath the mound top and under the guides 25, as appears in Figs. 4, 6, 8 and 9. The guide 26 is formed by two angle pieces in laterally spaced relation having their flanges projecting inwardly toward each other to form a T-shaped channel in which the shuttle 22 operates, as best appears in Figs. 4 and 6. The shuttle is the anchor guide member for support of the table when extended from either side so that the table will not tilt as the casket is moved out onto the outer end thereof. The shuttle has rollers 27 operating along the side flanges of the guide 26, and other rollers 28 to operate along the bottom of the top flanges of the guide 26 so as to sustain whatever lateral or vertical thrust is imposed. There are casters 29 distributed on the mound 19 to support the table for easy rolling action. The handles 30 provided on the front end of the table are used in pulling the table out through the sides of the hearse and pushing it back. Additional handles may be provided on the rear end for a similar purpose, if desired. However, the straight line motion out the rear is so much easier to manage that handles are not considered necessary. While we have disclosed our invention in connection with a hand operated table, it should, of course, be understood that we do not limit the application of the invention in that way, but contemplate use of the invention to an equal extent with power operated tables, such being particularly convenient in connection with hydraulically operated tables which are arranged interchangeably to be operated by power or by hand, as disclosed in the copending application of Edward Richter, Serial No. 4,729, filed February 4, 1935 (U. S. Patent No. 2,085,043, issued June 29, 1937).

Referring to Figs. 1, 2, and 12–14 the seats 14—15 are attached to guide rods or slides 31 and 32, respectively, slidable in tubular guides 31' and 32' projecting forwardly from the front wall 19a of the mound 19. These rods project rearwardly under the mound and are connected at their rear ends by means of links 31a—32a to arms 31b—32b pivoted on a stem projecting downwardly from the switch stop member 23.

The switch stop member 23 turns about its stem 60 as an axis in the bearing 61, from the opposite sides of which the guides 24, previously mentioned, extend.

A closure plate 34 equipped with a handle 35 for locking or unlocking, as well as removing and replacing the same, fits in an opening 36 provided therefor in the top wall of the mound 19 at the rear end thereof. The plate is arranged to rest on top of the rear ends of the angle members of the guide 26, as shown in Fig. 10, and it carries an abutment plate 37 which is narrow enough to fit in the space between the guide members 26. The abutment plate extends forwardly from the plate 34 in the guide 26 to a point where a lug 38 on its forward end fits under a yoke 39 similar to the yoke 40 provided on the rear end of the guide 26 behind the abutment plate 37. An adjustable stop 41, mounted in the front end of the abutment plate, is arranged to be engaged by the rear one of two rubber bumpers 42 provided on the front and rear of the shuttle 22, whereby to cushion the rearward movement of the table. The front bumper strikes a suitable abutment at the front end of the guide 26, indicated at 41' in Fig. 1. In that way, the impact is cushioned and silenced at both ends of the travel of the shuttle. The handle 35 turns a stem 43 received in a bearing in the rear end of the abutment plate 37, and an eccentric 44 is mounted on the lower end having a lug 45 thereon arranged to fit under the yoke 40 when the handle 35 is turned to the position shown in Figs. 2 and 11, whereby to lock the closure plate 34 and abutment plate 37 in the position shown in Fig. 2. When the handle 35 is turned through 180° in a counterclockwise direction from the position of Figs. 2 and 10, the lug 45 is withdrawn from beneath the yoke 40, and a small projection 45a on the lug 45 encounters a stop 46 projecting downwardly from the abutment plate 37. The plate 34 and abutment plate 37 can then be raised by means of the handle 35, and removed. This leaves the rear end of the guide 26 clear of any obstruction so that the table 18 can be moved rearwardly, as shown in Fig. 4. The extensions 25a of the guides 25, previously mentioned, are in alignment with the guide 26 to receive the middle guide member 21 in the rearward movement of the table and thus keep the table 18 moving on a line in the rearward movement mentioned, guided at 21 and 22 in guides 25a and 26, respectively. When the closure plate 34 is subsequently replaced, the lug 38 on the abutment plate 37 definitely locates the front end thereof when hooked under the yoke 39. Then the rear end is brought down with the eccentric 44 disposed in front of the yoke 40. The plate 34 is then locked merely by turning the handle 35 through approximately 180° in a clockwise direction from the position of Fig. 3 to that of Fig. 2. In this movement, the beveled face 47 on the lug 45 first encounters the yoke 40 and causes the plate 34 to be drawn downwardly firmly onto the guide 26. At the same time, the eccentric 44 is causing the closure plate 34 and abutment plate 37 to be forced forwardly as the eccentric rides on the front of the yoke 40. In this movement, the stop 41 engages and compresses the rear bumper 42, so that the guide pin 20 is forced firmly, yet resiliently, into the recess 33 in the switch member 23, thus resiliently clamping the table 18 so that there will be no likelihood of vibration or rattling when the hearse is in motion. The rear bumper 42 can also be compressed when the table 18 is moved home from a side delivery position, as indicated in Fig. 5; the stop pin 20 in that figure is shown at the position corresponding to the point where the rear bumper 42 has just encountered the stop 41. It is obvious that a slight additional movement is required to bring the enlarged end of the pin 20 into the recess 33, and that the switch 23 acts as a cam to guide the pin into the recess, so that no appreciable force is required to accomplish the compression of the bumper 42. The stop projection 45a on the lug 45 may, if desired, also engage a limiting stop 48 provided on the yoke 40 so as to prevent the operator from turning the eccentric 44 beyond a dead-center position, or too far beyond such a position, a slight movement beyond being perhaps desirable from the standpoint of locking the handle 35 in the normal position.

The table 18 is arranged to be automatically stopped at a predetermined point in its rearward movement and releasably locked in the position shown in Fig. 4 with the table extending a certain distance from the hearse. Referring to Figs. 6 and 7, 49 is a latch or detent movable vertically in a guide 50 in the top wall of the mound 19 at the rear end thereof (see Fig. 1). This latch is attached to one end of a rocker 51, fulcrumed as at 52 in the mound 19 and having a manually operable knob 53 connected to its other end. The latter is guided, as at 54, in the mound, and retains a coiled compression spring 55 bearing on the end of the rocker 51 so that the knob 53 is normally in its depressed position and the latch 49 in its raised position, by virtue of spring 55. A keeper plate 56 is carried on the bottom of the table 18 and has a hole 57 therein arranged to receive the latch 49, as shown in Fig. 7, to positively lock the table against movement in either direction. An inclined surface 58 on the rear end of the keeper plate is arranged in the rearward movement of the table to engage and depress the latch 49, and promptly thereafter a shoulder 59 on the keeper plate strikes the latch 49 and prevents further movement, whereupon the latch, being in register with the hole 57, enters the hole under action of the spring 55 and automatically locks the table. The table is, therefore, held so that the casket can be unloaded and replaced without danger of the table moving. After the casket has been replaced, the knob 53 can be raised to withdraw the latch 49 from the keeper plate 56, and thus allow the table 18 to be returned to its normal position. The latch 49 can also be held retracted when it is desired to remove the table 18 from the hearse, as, for example, for cleaning, inspection, repair, or oiling.

It is believed the foregoing conveys a good understanding of the objects and advantages of our invention. The appended claims are drawn with a view to covering all legitimate modifications and adaptations.

We claim:

1. In a hearse of the side delivery type, guide means having a guide portion extending lengthwise of the hearse, and laterally extending guide portions, the inner ends of which are located between the ends of the longitudinal portion, a casket table having three guide members projecting downwardly therefrom, namely, a rear member for operation lengthwise in the longitudinal portion, a middle member for operation normally in either of the lateral portions, and a front member for locking and steering the table, a switch member normally engaging the front member to lock the table against forward and lateral movement but permitting rearward movement, and arranged when moved to permit movement of the table forwardly and laterally toward one side or the other of the hearse, and means releasably engaging the rear guide member to prevent rearward movement of the table.

2. In a hearse of the side delivery type, guide means having a longitudinal guide portion extending lengthwise of the hearse and a laterally extending guide portion, the inner end of which is between the ends of the longitudinal guide portion, a casket table having three guide members projecting downwardly therefrom, namely, a rear member for operation lengthwise in the longitudinal portion, a middle member for operation normally in the lateral portion, and a front member for locking and steering the table, the second member being normally movable into the lateral guide portion for compound movement of the table forwardly and laterally but being arranged to move rearwardly in simple longitudinal movement of the table rearwardly, a front retaining means normally engaging the front member to lock the table against forward and lateral movement but permit rearward movement, and arranged when moved to permit movement of the table forwardly and laterally, and means releasably engaging the rear guide member to prevent longitudinal movement of the table rearwardly.

3. In a hearse of the side delivery type, guide means having a guide portion extending lengthwise of the hearse, and laterally extending guide portions, the inner ends of which are located between the ends of the longitudinal portion, a casket table having three guide members projecting downwardly therefrom, namely, a rear member for operation lengthwise in the longitudinal portion, a middle member for operation normally in either of the lateral portions, and a front member for locking and steering the table, a switch member normally engaging the front member to lock the table against forward and lateral movement but permit rearward movement, and arranged when moved to permit movement of the table forwardly and laterally toward one side or the other of the hearse, a resilient bumper associated with the rear guide member, and an abutment arranged in the return of the table to its normal position from a forward, laterally extending position to be engaged by said bumper to limit the rearward movement and cushion the impact, said switch member having a locking recess for reception of the front guide member when moved home, the recess being so disposed with respect to said abutment whereby to necessitate compression of said bumper in the movement of the guide member into the recess.

4. In a hearse of the side delivery type, guide means having a guide portion extending lengthwise of the hearse, and laterally extending guide portions, the inner ends of which are located between the ends of the longitudinal portion, a casket table having three guide members projecting downwardly therefrom, namely, a rear member for operation lengthwise in the longitudinal portion, a middle member for operation normally in either of the lateral portions, and a front member for locking and steering the table, a switch member normally engaging the front member to lock the table against forward and lateral movement but permit rearward movement, and arranged when moved to permit movement of the table forwardly and laterally toward one side or the other of the hearse, a resilient bumper associated with the rearguide member, and an abutment therefor in the rear end of the longitudinal guide portion arranged normally to be engaged by the bumper to limit rearward movement of the table and cushion the impact, said abutment being movable out of said position whereby to permit longitudinal movement of the table rearwardly.

5. In a hearse of the side delivery type, guide means having a guide portion extending lengthwise of the hearse, and a laterally extending guide portion, the inner end of which is located between the ends of the longitudinal portion, a casket table having three guide members projecting downwardly therefrom, namely, a rear member for operation lengthwise in the longitudinal portion, a middle member for operation normally in the lateral portion, and a front member for locking and steering the table, a switch member normally engaging the front member to lock the table against forward and lateral movement but permit rearward movement, and arranged when moved to permit movement of the table forwardly and laterally, a resilient bumper associated with the rear guide member, a member arranged to be removably disposed behind the table having an abutment arranged to be engaged by said bumper whereby to limit the rearward movement of the table and cushion the impact, and means for removably securing said member in its operative position.

6. A structure as set forth in claim 5 including means whereby said abutment is arranged to be forcibly moved forward to compress the bumper.

7. A structure as set forth in claim 5 wherein the removable member comprises a closure plate and the abutment thereon comprises a plate mounted on the closure plate for abutment with the bumper, the structure including means arranged in the fastening of the closure plate to forcibly move the abutment plate forward against the bumper.

8. In a hearse of the side delivery type, a movable casket supporting table, guide means for said table providing for predetermined movement of the table forwardly and laterally toward either side of the hearse or longitudinally toward and out the rear end of the hearse, a switch member associated with said guide means and movable to either one of two operative positions determining movement of the table toward one side or the other of the hearse, said switch member in an intermediate closed position permitting rearward movement of said table, a pair of seats normally disposed adjacent the front end of said table, either of said seats being movable forwardly to an out-of-the-way position relative to said table, operating mechanism operated in the movement of either seat to shift the switch member to an open position to provide for lateral movement of the table past the moved seat, and means normally disposed in a position preventing rearward movement of the table but arranged to be moved to permit rearward movement of the table when desired.

9. In a hearse of the side delivery type, a movable casket supporting table, guide means for said table providing for predetermined movement of the table forwardly and laterally toward either side of the hearse or longitudinally toward and out the rear end of the hearse, a rotary switch member associated with said guide means and rotatable from an intermediate table locking position in either direction to table switching positions determining lateral movement of the table toward one side or the other of the hearse, said switch member in the locking position permitting rearward movement of said table, a pair of seats normally disposed adjacent the front end of said table, either of said seats being movable forwardly to an out-of-the-way position relative to said table, operating mechanism operated in the movement of either seat to turn the switch member to an open position to provide for movement of the table laterally past the moved seat, and a member normally disposed to cooperate with the switch member in its intermediate table locking position to lock the table against rearward movement but retractable so as to permit longitudinal movement of the table rearwardly.

10. In a hearse of the side delivery type, guide means having a guide portion extending lengthwise of the hearse, and a laterally extending guide portion, the inner end of which is located between the ends of the longitudinal portion, a casket table having guide members projecting downwardly therefrom, one of said guide members being operable lengthwise in the longitudinal portion and another of said guide members being operable normally in the lateral portion, a table locking member serving to hold the table against forward and lateral movement but permitting rearward movement, said member being arranged to be moved to a position permitting movement of the table forwardly and laterally toward one side or the other of the hearse, a resilient bumper associated with the second guide member, a member arranged to be removably disposed behind the table having an abutment arranged to be engaged by said bumper whereby to limit the rearward movement of the table and cushion the impact, and means for removably securing said member in its operative position, said removable member comprising a closure plate and the abutment thereon comprising a plate mounted on the closure plate for abutment with the bumper, and means arranged in the fastening of the closure plate to forcibly move the abutment plate forward against the bumper.

11. In a hearse of the side delivery type, a movable casket supporting table, guide means for said table providing for movement of the table forwardly and laterally toward either side of the hearse or longitudinally toward and out the rear end of the hearse, a table locking member normally disposed so as to prevent forward and lateral movement of the table, a seat normally disposed adjacent the front end of the table but movable forwardly to an out-of-the-way position relative thereto, operating mechanism operated in the movement of the seat to operate the table locking member to an open position permitting forward and lateral movement of the table, and means normally disposed in a position preventing rearward movement of the table but arranged to be moved to permit rearward movement when desired.

12. In a hearse of the side delivery type, guide means having a guide portion extending lengthwise of the hearse, and a laterally extending guide portion, the inner end of which is located between the ends of the longitudinal portion, a casket table having three members projecting downwardly therefrom, namely, a rear guide member for operation lengthwise in the longitudinal portion, a middle guide member for operation normally in the lateral portion, and a front member for locking the table, means detachably engaging the front member to lock the table against forward and lateral movement but permit rearward movement, a resilient bumper associated with the rear guide member, a member arranged to be removably disposed behind the table having an abutment arranged to be engaged by said bumper whereby to limit the rearward movement of the table and cushion the impact, and means for removably securing said member in its operative position, the removable member comprising a closure plate and the abutment thereon comprising a plate mounted on the closure plate for abutment with the bumper, and means arranged in the fastening of the closure plate to forcibly move the abutment plate forward against the bumper.

13. In a hearse of the side delivery type, a movable casket supporting table, guide means for said table providing for movement of the table forwardly and laterally toward either side of the hearse or longitudinally toward and out the rear end of the hearse, a table locking member normally disposed so as to prevent forward and lateral movement of the table, a seat normally disposed adjacent the front end of the table but movable forwardly to an out-of-the-way position relative thereto, operating mechanism operated in the movement of the seat to operate the table locking member to an open position permitting forward and lateral movement of the table, and means normally disposed in a position preventing rearward movement of the table but mounted so as to be quickly removable and releasable, whereby to permit longitudinal movement of the table rearwardly upon removal of said means.

14. In a hearse of the side delivery type, a movable casket supporting table, guide means for said table providing for movement of the table forwardly and laterally toward the side of the hearse or longitudinally toward and out the rear end of the hearse, a table locking member normally disposed so as to prevent forward and lateral movement of the table, a seat normally disposed adjacent the front end of the table but movable forwardly to an out-of-the-way position relative thereto, operating mechanism operated in the movement of the seat to operate the table locking member to an open position permitting forward and lateral movement of the table, and means normally disposed in a position preventing rearward movement of the table but mounted so as to be quickly retracted, whereby to permit longitudinal movement of the table rearwardly upon retraction of said means.

15. In a hearse of the side delivery type, a movable casket supporting table, guide means for said table providing for movement of the table forwardly and laterally toward either side of the hearse or longitudinally toward and out the rear end of the hearse, a table locking member normally disposed so as to prevent forward and lateral movement of the table, a pair of seats disposed side by side adjacent the front end of the table and movable individually forwardly to out-of-the-way positions relative to the table, either seat being movable out of the way when the table is to be moved forwardly and laterally past said seat operating mechanism operated in the movement of either seat to operate the table locking member to open position permitting forward and lateral movement of the table, and means normally disposed in a position preventing rearward movement of the table but mounted so as to be quickly retracted, whereby to permit longitudinal movement of the table rearwardly upon retraction of said means.

16. In a hearse of the side delivery type, a movable casket supporting table, guide means for said table providing for movement of the table forwardly and laterally toward the side of the hearse or longitudinally toward and out the rear end of the hearse, a rotary table locking member normally disposed in locking position so as to prevent forward and lateral movement of the table, means for turning the table locking member to and from locked position, the locking member being so constructed as to allow rearward movement of the table relative thereto when in locked position, and other means normally disposed in a position preventing rearward movement of the table but mounted so as to be quickly retracted, whereby to permit longitudinal movement of the table rearwardly upon retraction of said means, said last named means also being so constructed as to allow forward movement of the table relative thereto when in operative position.

17. In a hearse comprising a floor having a slot provided therein, a closure plate for entry in said slot, means in the slot for supporting said plate against downward displacement, a transverse member adjacent one end of said plate rigid with the floor under which a projection on the end of said plate is engageable so as to hold down the end of the plate, a handle rotatably mounted on the other end of the plate on a substantially vertical axis, a second transverse member adjacent this end of the plate rigid with the floor, and a locking cam rotatable with the handle in front of said member, said cam having one cam portion arranged to slidably engage the front of said member to force the plate endwise toward the first mentioned transverse member, and another cam portion arranged to slidably engage under said member to force the handle end of the plate downwardly in the turning of the cam by the handle.

18. A hearse construction as set forth in claim 17, including a downward projection on the second transverse member engageable by the second cam portion of the rotary cam to limit turning of the cam in locking direction.

19. A hearse construction as set forth in claim 17, including a downward projection on the second transverse member engageable by the second cam portion of the rotary cam to limit turning of the cam in locking direction, and another downward projection on the bottom of the closure plate in forwardly spaced relation to the rotary cam for engagement by the second cam portion when the rotary cam is turned approximately a half turn in the opposite direction.

20. In a hearse of the side delivery type, a movable casket supporting table, guide means therefor including tracks on the floor of the hearse and downward projections on the table for engagement with said tracks to guide the table for compound longitudinal and lateral movement toward either side of the hearse, a single rotary combined switch and stop member normally engaging a downward projection on the table in an intermediate table-locking position but rotatable in either direction from such position permitting movement of the table toward one side of the hearse while preventing movement toward the other side, or vice versa, and manually operable means for turning said rotary member.

21. In a hearse of the side delivery type, a movable casket supporting table, guide means therefor including tracks on the floor of the hearse and downward projections on the table for engagement with said tracks to guide the table for compound longitudinal and lateral movement toward either side of the hearse, a single rotary combined switch and stop member normally engaging a downward projection on the table in an intermediate table-locking position but rotatable in either direction from such position permitting movement of the table toward one side of the hearse while preventing movement toward the other side, or vice versa, a pair of seats normally disposed in proximity to the front end of said table in side by side relation and so arranged that when either of said seats is moved forward there is sufficient clearance for movement of the table forwardly and laterally behind the seat so moved, and operating mechanism connected with said seats and operated in the movement thereof so as to turn the rotary member to permit movement of the table past whichever seat is moved forward.

22. In a hearse of the side delivery type, a guide member having a guide portion extending lengthwise of the hearse and a pair of related guide portions extending laterally relative to the longitudinal guide portion in opposite directions toward the sides of the hearse, a movable casket supporting table guided in its movement by the longitudinal guide portion and a selected one of said laterally extending guide portions, another pair of guide portions extending laterally in opposite directions relative to the longitudinal guide portion and a combination switch and stop member movably mounted between said last named guides to guide said table for movement toward one side or the other of the hearse according to the position of the switch-stop member, the same functioning in a mutually exclusive manner relative to the last named guide portions to open one of said guide portions and close the other to permit lateral movement of the table in one direction while preventing lateral movement in the opposite direction.

23. In a hearse of the side delivery type, a guide member having a guide portion extending lengthwise of the hearse and a pair of related guide portions extending laterally relative to the longitudinal guide portion in opposite directions toward the sides of the hearse, a movable casket supporting table guided in its movement by the longitudinal guide portion and a selected one of said laterally extending guide portions, and a combination switch and stop member movably mounted between said laterally extending guide portions to guide said table for movement toward one side or the other of the hearse according to the position of the switch-stop member, the same functioning in a mutually exclusive manner relative to the last-named guide portions to open one of said guide portions and close the other to permit lateral movement of the table in one direction while preventing lateral movement in the opposite direction.

24. In a hearse, a mound structure, a casket table movable relative to the top of said mound structure, cooperating guide means on the table and mound structure for guiding the table toward either side of the hearse, an oscillating switch member on the mound structure cooperating with the guide means on the table to predetermine the direction of movement of the seat, tubular guides extending horizontally from the mound structure, guide rods working in said guides, said rods projecting into the mound structure, and operating mechanism in the mound structure interconnecting the switch member and the rear ends of said rods, whereby to turn the switch member in one direction when one of said rods is moved and in the other direction when the other of said rods is moved.

25. In a hearse having a floor and a seat movable back and forth thereon, a mound structure projecting upwardly from the floor behind the seat and in such proximity to the back of the seat that movement of the casket table forwardly and laterally is permitted only when the seat is moved forward, a movable casket table on the mound structure, a keeper for retaining the table, and mechanism providing an operating connection between the keeper and the seat whereby the seat in moving forward from normal position serves to operate the keeper so as to permit movement of the table past the same.

26. In a hearse having a floor and a seat movable back and forth thereon, a mound structure projecting upwardly from the floor behind the seat and in such proximity to the back of the seat that movement of the casket table forwardly and laterally is permitted only when the seat is moved forward, a movable casket table thereon, a keeper for retaining the table, a tubular guide extending horizontally from the front of the mound structure beneath the seat, a guide rod attached to the seat and working in said guide, and mechanism providing an operating connection between the rod and keeper whereby when the seat is moved forwardly from normal position the keeper is operated so as to permit movement of the table past the seat.

27. In a hearse having a floor and a seat movable back and forth thereon, a mound structure projecting upwardly from the floor behind the seat and in such proximity to the back of the seat that movement of the casket table forwardly and laterally is permitted only when the seat is moved forward, a movable casket table on the mound structure, a keeper for retaining the table, a tubular guide extending horizontally from the front of the mound structure beneath the seat, a guide rod attached to the seat and working in said guide, mechanism providing an operating connection between the rod and keeper whereby when the seat is moved forwardly from normal position the keeper is operated so as to permit movement of the table past the seat, and means for releasably locking the rod against movement relative to the guide.

28. In a hearse having a floor supporting a pair of seats for fore and aft movement, a mound structure projecting upwardly from the floor behind the seats and in such proximity to the back of the seat that movement of the casket table forwardly and laterally is permitted only when the seat is moved forward, a casket table movable on said mound structure, an oscillatable keeper member on the mound structure for releasably locking the table against movement, tubular guides for the seats extending horizontally from the front of the mound structure beneath the seats, guide rods attached to the seats and working in said guides, means providing operating connections between the keeper and the rear ends of said rods whereby the keeper is turned so as to permit movement of the table past the moved seat, means for individually releasably locking each of said rods against movement, and means operated with the first means for locking the other rod and seat against movement when one of the seats is moved to out-of-the-way position.

29. In a side delivery hearse, a combined switching and locking means for the casket table adapted to move out of either side of the hearse, comprising a rotary table switching and locking member having a T-head turning therewith, a support for said rotary member having a stop arranged for engagement by either arm of the T-head when oscillated in either direction from a central position, two operating arms separately operable pivotally mounted with the T-head for oscillatory movement about the same center, and projections on said arms normally disposed in engagement on opposite sides of the leg of the T-head but arranged in the movement of said arms to engage the arms of the T-head to turn the same in either direction toward and into engagement with the aforesaid stop, said projections being so arranged with relation to said T-head arms and stop whereby when one projection engages the one arm of the T-head and moves it into engagement with the stop the other arm of the T-head comes into engagement with the other projection.

30. A combination actuating and locking mechanism for an oscillatable device comprising a T-head turning with said device, a support for said device having a stop arranged for engagement by either arm of the T-head when oscillated in either direction from a central position, two operating arms separately operable pivotally mounted with the T-head for oscillatory movement about the same center, and projections on said arms normally disposed in engagement on opposite sides of the leg of the T-head but arranged in the movement of said arms to engage the arms of the T-head to turn the same in either direction toward and into engagement with the aforesaid stop, said projections being so arranged with relation to said T-head arms and stop whereby when one projection engages the one arm of the T-head and moves it into engagement with the stop the other arm of the T-head comes into engagement with the other projection.

31. In combination, in a vehicle having a seat movable on the floor thereof, a hollow mound for supporting a movable load-carrying member thereon in elevated relation to the floor, guide means for the movable carrier on the mound including a movable locking member for retaining the carrier in retracted position, a seat guide tube projecting from said mound substantially horizontally, a rod member slidable in the tube and attached to the seat and projecting into said mound, means interconnecting said rod member and locking member inside the mound whereby, when said rod member moves with the seat to remote relation to the mound, the locking member is moved to open position permitting movement of the carrier relative to the vehicle, but when the rod member returns in the return movement of the seat, the locking member is moved to closed position to retain the carrier in retracted position, and manually operable means for locking one of said rod and locking members in at least one of its extreme positions.

EDWARD RICHTER.
EARL L. SCHOFIELD.